(12) United States Patent
Artzi

(10) Patent No.: US 6,553,009 B2
(45) Date of Patent: *Apr. 22, 2003

(54) DIRECT SATELLITE COMMUNICATION

(75) Inventor: Tiberiu Artzi, Haifa (IL)

(73) Assignee: Satellite-Smart Solutions Ltd., Yokneam Ilit (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,180

(22) Filed: Jul. 9, 1999

(65) Prior Publication Data

US 2003/0007465 A1 Jan. 9, 2003

(51) Int. Cl.[7] .............................................. H04B 7/185
(52) U.S. Cl. ....................................... 370/316; 370/349
(58) Field of Search ................................ 370/315, 316, 370/323, 325, 345, 349; 340/506, 524, 531, 539, 825.32, 825.44, 825.45, 825.46; 455/404, 406, 456, 521, 426, 427, 12.1

(56) References Cited

U.S. PATENT DOCUMENTS

| | | | | |
|---|---|---|---|---|
| 4,947,451 A | * | 8/1990 | Nawata | ........................ 455/8 |
| 5,410,728 A | | 4/1995 | Bertiger et al. | |
| 5,454,024 A | * | 9/1995 | Lebowitz | ..................... 379/40 |
| 5,664,006 A | | 9/1997 | Monte et al. | |
| 5,666,648 A | | 9/1997 | Stuart | |
| 5,678,175 A | | 10/1997 | Stuart | |
| 5,731,785 A | * | 3/1998 | Lemelson et al. | .......... 342/357 |
| 6,157,621 A | * | 12/2000 | Brown et al. | ................ 370/310 |
| 6,295,283 B1 | * | 9/2001 | Falk | ........................... 370/325 |
| 6,430,167 B1 | * | 8/2002 | Falk | ........................... 370/325 |

* cited by examiner

Primary Examiner—Kwang Bin Yao
(74) Attorney, Agent, or Firm—G.E. Ehrlich Ltd.

(57) ABSTRACT

A system and a method for direct communication between a remote ground transceiver and the intended recipient, such as a management station, through a satellite. The disclosed system and method are particularly useful for the rapid transmission of short messages, such as alarm messages, from equipment at remote sites to the management station. Optionally and preferably, messages can also be passed from the management station to the remote site, for example in order to transmit a command, such that a human supervisor at the management station would be able to respond to the alarm message. The messages are rapidly transmitted by passing directly from the satellite to the final recipient The satellite optionally determines the information necessary for billing and optionally passes this information to a ground center for sending the bill to the client. In addition, the messages are optionally encrypted by the transmitter and/or the satellite, such that the message can then be broadcast to all receivers but only decrypted by a receiver with the proper key. Thus, the method and system are able to unlink the process of sending the message to a gateway from the process of transmitting the information to the final recipient, thereby increasing the speed at which the information is transferred.

8 Claims, 5 Drawing Sheets

DIRECT SATELLITE COMMUNICATION

FIELD AND BACKGROUND OF THE INVENTION

The present invention is of a method and a system for direct communication through a satellite for a ground transceiver, and in particular, for such direct, rapid communication between a remote ground transceiver and a management center for the purpose of transmitting an alarm.

Automated technology has enabled equipment which is located in remote, areas to be managed at a management station. Such automated technology includes sensors for detecting equipment malfunctions, security mechanisms against theft, and other monitoring devices for ensuring the proper function of the equipment without the presence of a human operator. These monitoring devices must be able to relay their findings to a management station, particularly in the case of an equipment malfunction such that an alarm would be required. Transceivers which are based on a communication through a satellite is often the best or even the only choice for enabling the remote equipment to communicate with the management station.

Such transceivers operate through wireless communication with the satellite, which then relays the communication to the intended recipient, such as the management system. For the greatest speed and ease of access, such communication should occur directly through the satellite between the ground transceiver associated with the equipment and the transceiver associated with the management station, without passing through one or more additional ground station devices for communication.

Unfortunately, such a system has the drawback of difficulty for enforcing billing and security requirements. For example, a typical satellite system could send all received communication from a ground transceiver to a remote gateway station which is closest to the intended recipient. Such a system has the advantage that authorized access and security is relatively easy to enforce, since the gateway could authenticate the intended recipient as well the identity of the transmitting party before passing the communication to its final destination. Under such a system, the unauthorized use of the satellite is much more difficult, and customers can be appropriately billed according to their use of the system. Thus, gateways are useful for ensuring that both the customer and the owner of the satellite have appropriate security measures.

Unfortunately, one drawback of such gateways is that the satellite must be within communicating distance of the gateway before the received communication can be passed back to the ground. For example, low earth orbit satellites typically have a "footprint", or diameter of the area in which service is provided by the satellite at any particular moment, on the order of about 3,000 kilometers. Therefore, the gateway must be within the "footprint" of the satellite as the satellite orbits around the Earth in order to communicate with the satellite. Such a requirement can add significantly to the period of time which must elapse before the message or other communication can be delivered from the satellite to the gateway. In addition, the gateway must either rely on ground communication networks in order to deliver the message to the intended recipient, which can be slow and of limited bandwidth; or the gateway must retransmit the message to the satellite for transmission to the intended recipient, if the intended recipient can communicate with the satellite. The message must therefore pass through the gateway at least once, even if the gateway does not then deliver the message to the intended recipient through ground communication networks. An additional cause for the potentially lengthy period of time required for passing the message through the gateway is that the gateway also may perform authentication, which may require extra sessions with the gateway before the message is delivered to the intended recipient. Thus, the requirement for a gateway can increase the amount of time required for the transmission of the communication from the remote ground transceiver to the intended recipient.

There is therefore a need for, and it would be useful to have, a system and a method for direct communication from a remote ground transceiver to the intended recipient through a satellite, without requiring any additional ground communication network, which is fast, efficient, secure and cost effective since no extra ground devices are needed.

SUMMARY OF THE INVENTION

The method and system of the present invention enable direct communication to occur between a remote ground transceiver and the intended recipient, such as a management station, through a satellite. The system and method are particularly useful for the rapid transmission of short messages, such as alarm messages, from equipment at remote sites to the management station. The messages are rapidly transmitted by passing directly from the satellite to the final recipient. The satellite determines the information necessary for billing and optionally passes this information to a ground center for sending the bill to the client. Thus, the method and system of the present invention are able to unlink the process of billing from the process of transmitting the information to the final recipient, thereby increasing the speed at which the information is transferred.

According to the present invention, there is provided a system for automatically sending an alarm message from a remote location in real time, comprising: (a) a remote installation at the remote location, the remote installation featuring: (i) a remote equipment; (ii) a remote monitoring device for automatically monitoring a function of the remote equipment, such that if the remote equipment malfunctions, the alarm message is issued; (iii) a remote transmitter for packaging the alarm message in an alarm packet and for transmitting the alarm packet; (b) a satellite for receiving the alarm packet, for analyzing the alarm packet to determine a destination address for the alarm packet, and for sending the alarm packet to the destination address; and (c) a central management station having the destination address and featuring a receiver for receiving the alarm packet, and for analyzing the alarm packet to retrieve the alarm message.

Optionally and preferably the remote installation further comprises: (iv) a remote installation receiver for receiving a command message from the central management station; and wherein the central management station further comprises a central management station transmitter for transmitting the command message To the remote installation receiver, to instruct the remote installation. This optional but preferred embodiment enables a human supervisor at the central management station to respond to the alarm, for example, by communicating with devices at the remote installation.

According to another embodiment of the present invention, there is provided a method for transmitting a message in real time from a transmitter to a receiver through a satellite, the method comprising the steps of: (a) packaging the message in a packet, the packet featuring a source address for the transmitter, and a destination address for the receiver; (b) transmitting the packet from the transmitter to the satellite; (c) analyzing the packet by the satellite to determine the destination address for the receiver; (d) sending the packet by the satellite to the receiver; (e) examining the packet by the receiver to determine if the destination address matches a source address for the receiver; and (t) if the destination address matches the source address for the receiver, extracting the message from the packet by the receiver.

Hereinafter, the term "computing platform" refers to a computer hardware system or to a software operating system, and more preferably refers to a combination of computer hardware and the software operating system which is run by that hardware. Examples of particularly preferred computing platforms include, but are not limited to, embedded systems such as devices operated by Windows CE™ (Microsoft Ltd., USA) or Vx Works™, as well as any embedded operating systems suitable for use with a satellite or other communications product.

For the implementation of the present invention, a software application could be written in substantially any suitable programming language, which could easily be selected by one of ordinary skill in the art. The programming language chosen should be compatible with the computing platform according to which the software application is executed. Examples of suitable programming languages include, but are not limited to, C, C++ and Java.

In addition, the present invention could also be implemented as firmware or hardware. Hereinafter, the term "firmware" is defined as any combination of software and hardware, such as software instructions permanently burnt onto a ROM (read-only memory) device. As hardware, the present invention could be implemented as substantially any type of chip or other electronic device capable of performing the functions described herein.

In any case, the present invention can be described as a plurality of instructions being executed by a data processor, in which the data processor is understood to be implemented according to whether the present invention is implemented as software, hardware or firmware.

BRIEF DESCRIPTION OF THE DRAWINGS

The invention is herein described, by way of example only, with reference to the accompanying drawings, wherein.

DESCRIPTION OF THE PREFERRED EMBODIMENTS

The method and system of the present invention enable direct communication to occur between a remote ground transceiver and the intended recipient, such as a management station, through a satellite. The system and method are particularly useful for the rapid transmission of short messages, such as alarm messages, from equipment at remote sites to the management station. The messages are rapidly transmitted by passing directly from the satellite to the final recipient. The satellite determines the information necessary for billing and optionally passes this information to a ground center for sending the bill to the client. Thus, the method and system of the present invention are able to unlink the process of billing from the process of transmitting the information to the final recipient, while still being able to authenticate the users of the system, thereby increasing the speed at which the information is transferred while maintaining system security.

The principles and operation of a method and a system according to the present invention may be better understood with reference to the drawings and the accompanying description.

Figure 1:
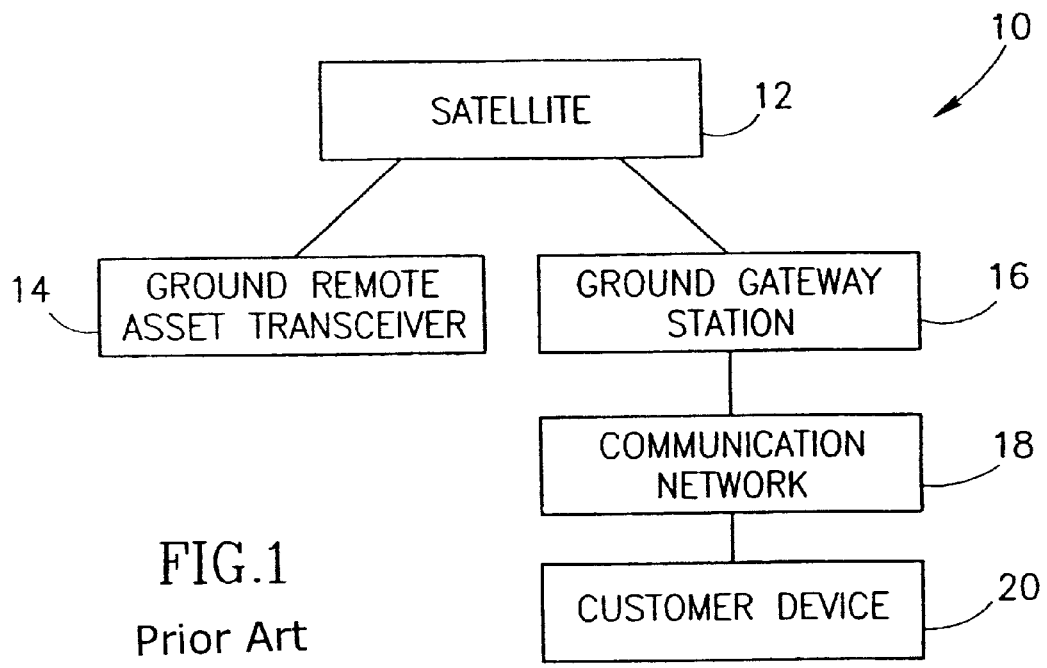
FIG. 1 is a schematic block diagram showing a background art system.

Referring now to the drawings, FIG. 1 shows an exemplary background art system for relaying communication through a satellite and a ground gateway station. A background art system 10 features at least one satellite 12, which is preferably in low earth orbit. Satellite 12 receives a communication from a ground remote asset transceiver 14 when ground remote asset transceiver 14 is within the "footprint" of satellite 12.

Satellite 12 ten passes this communication to a ground gateway station 16 when ground gateway station 16 is within the "footprint" of satellite 12. As its name suggests, ground gateway station 16 is a gateway for these messages from satellite 12 to the ground, and is connected to a ground communication network 18. Ground gateway station 16 passes the communication to a final recipient customer device 20 through ground communication network 18. Alternatively, ground gateway station 16 can optionally retransmit the message to satellite 12 for passing to final recipient customer device 20, if final recipient customer device 20 can communicate with satellite 12. The message must therefore pass through ground gateway station 16 at least once, even if ground gateway station 16 does not then deliver the message to final recipient customer device 20 through ground communication network 18.

In addition, ground gateway station 16 also typically performs authentication of final recipient customer device 20 and/or ground remote asset transceiver 14, which may require extra sessions between ground gateway station 16 and final recipient customer device 20 and/or ground remote asset transceiver 14 before the message is delivered to final recipient customer device 20.

Background art system 10 can be implemented according to a number of different methods which are well known in the art. For example, U.S. Pat. No. 5,664,006, incorporated by reference as if fully set forth herein, describes a system for connecting a user terminal device to a satellite and thence to a gateway. The gateway is then connected to a PSTN (public switched telephone network). As an additional example, U.S. Pat. No. 5,678,175, also incorporated by reference as if fully set forth herein, describes a system for communication with a plurality of satellites. Both of these examples contained detailed information about the frequency spectrum for communication between a ground transceiver and a low earth orbit satellite, orbiting at for example a 1414 km low earth orbit.

For example, ground remote asset transceiver 14 could attempt to contact satellite 12 to request a channel. Ground remote asset transceiver 14 could be any device which is capable of receiving and transmitting signals in the correct frequency spectrum, such as any device which features a RF modem for example. The channel between ground remote asset transceiver 14 and satellite 12 is preferably determined according to a Time Division Multiple Access (TDMA) protocol, such that ground remote asset transceiver 14 would request a time slot for transmitting to satellite 12, for example However, the initial request from ground remote asset transceiver 14 is preferably sent according to a random access ALOHA protocol, which is an example of a contention protocol (for a description of ALOHA and its variants, see Tanenbaum A. S., *Computer Networks*, Prentice-Hall, 1996, pp. 121–124 for example).

Once satellite 12 receives the request, assuming that a collision does not occur between this request message and such a message from a different ground remote asset transceiver 14, satellite 12 assigns a particular time slot to ground remote asset transceiver 14. Ground remote asset transceiver 14 then transmits data to satellite 12. Satellite 12 then passes this communication to a ground gateway station 16 when ground gateway station 16 is within the "footprint" of satellite 12. Ground gateway station 16 also features a suitable transceiver device for receiving signals in the desired frequency range, such as a RF modem for example. Preferably, satellite 12 and ground gateway station 16 communicate according to a TDMA (Time Division Multiple Access) protocol, although other communication protocols could be used as is well known in the art, such as the CDMA (Code Division Multiple Access) protocol. Ground gateway station 16 is connected to ground communication network(s) 18 as noted previously, which could be a PSTN for example. The message is then passed to final recipient customer device 20. Ground gateway station 16 also determines the amount to be charged to the customer for the transmission, and may optionally send an acknowledgment message to ground remote asset transceiver 14, indicating that the message was received.

Thus, there are at least three stages in the process of transmitting the communication which can cause delay: waiting for satellite 12 to be accessible by ground remote asset transceiver 14; waiting for ground gateway station 16 to be accessible by satellite 12; and passing the communication from ground gateway station 16 to final recipient customer device 20. Another stage which may cause delay is the authentication of ground remote asset transceiver 14 and/or final recipient customer device 20. For example, if there are relatively few ground gateway stations 16 which are available for receiving transmissions, or if one such ground gateway station 16 malfunctions or otherwise becomes inaccessible to satellite 12, satellite 12 cannot rapidly transmit the received message. In addition, ground remote asset transceiver 14, satellite 12 and final recipient customer device 20 may all be located within the "footprint" of satellite 12. However, if ground gateway station 16 is located outside of the "footprint", then the message cannot be rapidly transferred.

Figure 2:
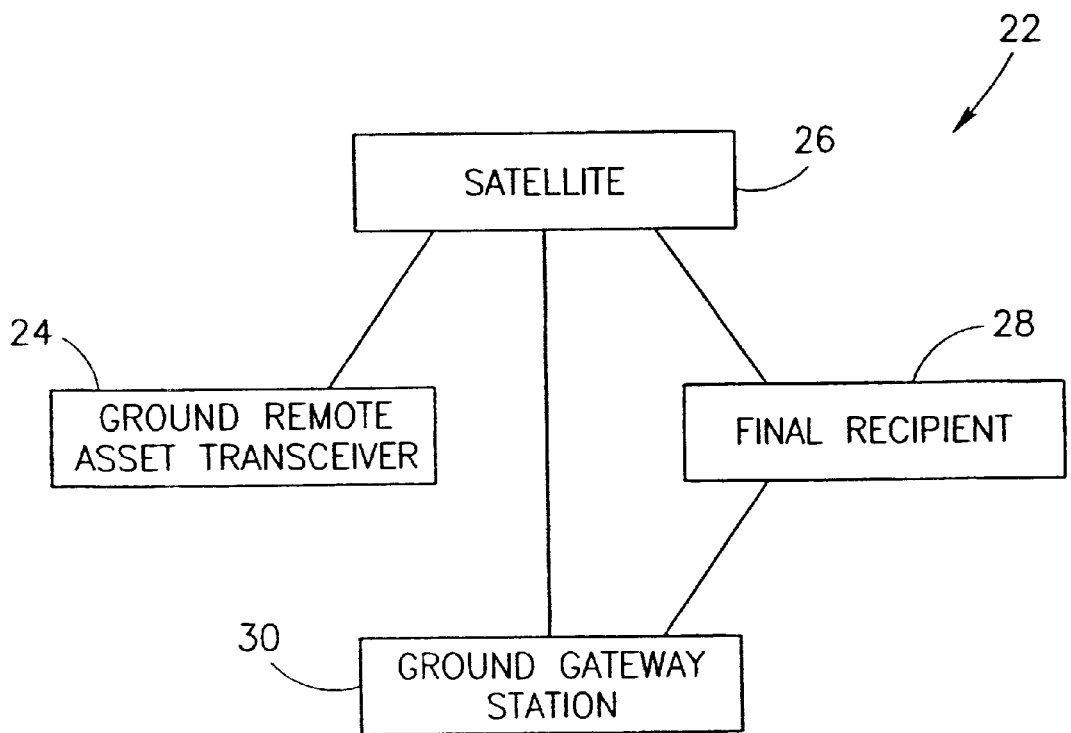
FIG. 2 is a schematic block diagram showing an exemplary system according to the present invention.

FIG. 2 shows a system 22 according to the present invention for transmitting the received message rapidly and efficiently, particularly for short messages, which overcomes the disadvantages of background art system 10. System 22 also features a ground remote asset transceiver 24, a satellite 26 and a final recipient customer device 28. However, now final recipient customer device 28 contains the RF (radio frequency) modem, such as a VHF (very high frequency) modem, as system 22 optionally does not contain a gateway station. In system 22, ground remote asset transceiver 24 again requests a channel for communication with satellite 26. Once such a request is approved and ground remote asset transceiver 24 receives the channel, for example an assignment for a particular time slot, ground remote asset transceiver 24 then transmits the message.

Preferably, the message is in the form of a short message of a defined type recognized by satellite 26, termed herein "notifying message". The term "short message" refers to messages of preferably less than about 160 bytes, more preferably contained in a single packet or other data unit. The packet features a header which is analyzed by satellite 26 in order to determine that the message is of the notifying type for direct satellite communication. The header preferably includes the packet type, source address and destination address. Satellite 26 also optionally examines the header in order to determine the destination address of final recipient customer device 28 to which the message is to be sent. Alternatively, satellite 26 does not examine the header of the packet, but rather transmits the notifying message to substantially all final recipient customer devices 28 within the "footprint" of satellite 26, such that the message is broadcast. Preferably, the message is encrypted before being broadcast. The specific final recipient customer device 28 for which the message is intended then decrypts the notifying message.

Satellite 26 then sends the notifying message to final recipient customer device 28 with the correct destination address, either directly or alternatively by broadcasting the encrypted message. The notifying message is transferred as quickly as possible, indeed is preferably transferred as soon as satellite 26 determines that final recipient customer device 28 is within the "footprint" for communication. Such a determination could be performed by receiving a brief transmission from final recipient customer device 28, for example. Alternatively and preferably, satellite 26 could send a brief "wake up" transmission to final recipient customer device 28 at a particular designated frequency or other signal transmission characteristic, such that final recipient customer device 28 would immediately, or at least rapidly, become available for receiving the transmission. Most preferably, however, final recipient customer device 28 is continuously ready to retrieve such transmissions, in order to ensure the most rapid transfer of the message. Thus, the notifying message is transferred to final recipient customer device 28 from ground remote asset transceiver 24 in "real time", which is preferably less than about 10 seconds for transmission, and more preferably less than about 6 seconds.

As described in greater detail below with regard to FIG. 4, preferably final recipient customer device 28 is specified by being able to read the notifying message, although a plurality of such final recipient customer devices 28 may receive the notifying message, For example, the notifying message could be encrypted, by ground remote asset transceiver 24 and/or by satellite 26, such that only final recipient customer device 28 is able to decrypt and read the notifying message. Alternatively, only final recipient customer device 28 could receive the notifying message. In either situation, preferably only final recipient customer device 28 which is specified by the destination address is able to retrieve information from the notifying message. Optionally and preferably, a group of final recipient customer devices 28 could be specified to receive and read the message, either with a single "group" destination address, or as a plurality of destination addresses.

Preferably, the encryption key is specific to each particular final recipient customer device 28, such that when ground remote asset transceiver 24 prepares to send a message to a particular final recipient customer device 28, ground remote asset transceiver 24 encrypts the message with that specific encryption key. Encrypting the message enables the particular final recipient customer device 28 to be authenticated for receiving the message without requiring a lengthy authentication procedure. Indeed, authentication procedures and "handshakes" are well known in the art, but require lengthy periods of time to perform, even as much as four to six seconds. By contrast, system 22 of the present invention enables the identity of the recipient to be automatically authenticated without such an authentication procedure, or alternatively and preferably the authentication procedure is performed at a later stage.

Final recipient customer device(s) 28 then preferably sends an acknowledgment message to satellite 26, which transfers this message to ground remote asset transceiver 24. Thus, ground remote asset transceiver 24 receives confirmation that the message was both correctly sent and received by the intended recipient. If ground remote asset transceiver 24 does not receive this acknowledgment message, optionally and preferably ground remote asset transceiver 24 could then resend the messages According to a preferred embodiment of the present invention, before satellite 26 sends the message to final recipient customer device 28, satellite 26 waits for authentication from a ground gateway station 30, which in this embodiment is acting as a trust management center. Ground gateway station 30 could authenticate ground remote asset transceiver 24 by indicating that the particular ground remote asset transceiver 24 having that destination address is authorized to send messages. Such an authentication could substantially prevent unauthorized users from sending messages while avoiding payment. Optionally, ground gateway station 30 could also authenticate final recipient customer device 28, thereby indicating that the particular final recipient customer device 28 with that source address is authorized to receive messages. Such an option could be implemented if a particular customer wishes to restrict the number of remote field devices which can receive messages, for example.

Optionally and preferably, satellite 26 then determines an amount of data that was transmitted, such that the customer is then charged for transmitting the message according to the amount of transmitted data. Alternatively, satellite 26 also determines the amount to be charged to the customer. Satellite 26 is required to at least partially perform this function for system 22 of the present invention, since system 22 does not require any such gateway station. Optionally and preferably, satellite 26 transmits the information for billing the customer to ground gateway station 30, including the amount of transmitted data and the source address for the transmitted data. Ground gateway station 30 then requests payment from the customer. Since the billing information does not require immediate, real time transmission, it is preferably sent in a packet to ground gateway station 30 whenever such a station is within the "footprint" of satellite 26. Alternatively, a flat rate could be charged to the customer, such that the amount of data being transmitted is not determined by satellite 26.

According to a preferred but optional embodiment of the present invention, longer messages than the "short message" type specified previously are sent. For example, such longer messages could be sent by transmitting a single packet or other data unit of a larger size. Alternatively and preferably, a plurality of such "short message" type packets could be sent by ground remote asset transceiver 24, with the header or other portion of the first packet containing a number to indicate the number of packets or other data units which are to follow. Thus, system 22 is sufficiently flexible to be able to send both small and large amounts of data in the notifying message type of communication.

Although system 22 of the present invention has been described with regard to transmissions from ground remote asset transceiver 24 to final recipient customer device 28, it is understood that communication could also occur in the opposite direction, from final recipient customer device 28 to ground remote asset transceiver 24. Indeed, system 22 is preferably implemented as a two-way communication system.

According to preferred embodiments of the present invention, the system and method can be optionally used in a number of different implementations. For example, the system and method could be used for sending alarm messages from a remote installation to a central management station. The remote installation could be monitored with automated monitoring devices, which would determine if a particular device or equipment is malfunctioning. Preferably, the automated monitoring device, optionally with a computing platform such as a device with an embedded system, would be packaged together with the mode in transceiver, such that the complete device could be easily installed at the remote installation.

If such a device malfunction is detected, then the transceiver at the remote installation could then send a short alarm message to the central management station. The human operators at the central management station would then have the option to intervene by requesting additional information from the automated monitoring devices, by causing the malfunctioning equipment and/or other equipment to cease operation, or by sending a human technician to assess and repair the damage. For example, the central management station could send a command message back to the remote installation in order to cause some action to be taken by one or more components of the remote installation, such as reporting on further monitored parameters or to cease functioning.

Again, as previously described, preferably either the remote installation or the central management station could operate as final recipient customer device 28 or as ground remote asset transceiver 24 interchangeably, since both the remote installation and the central management station are preferably capable of both sending and receiving the notifying messages according to the present invention.

Figure 3:
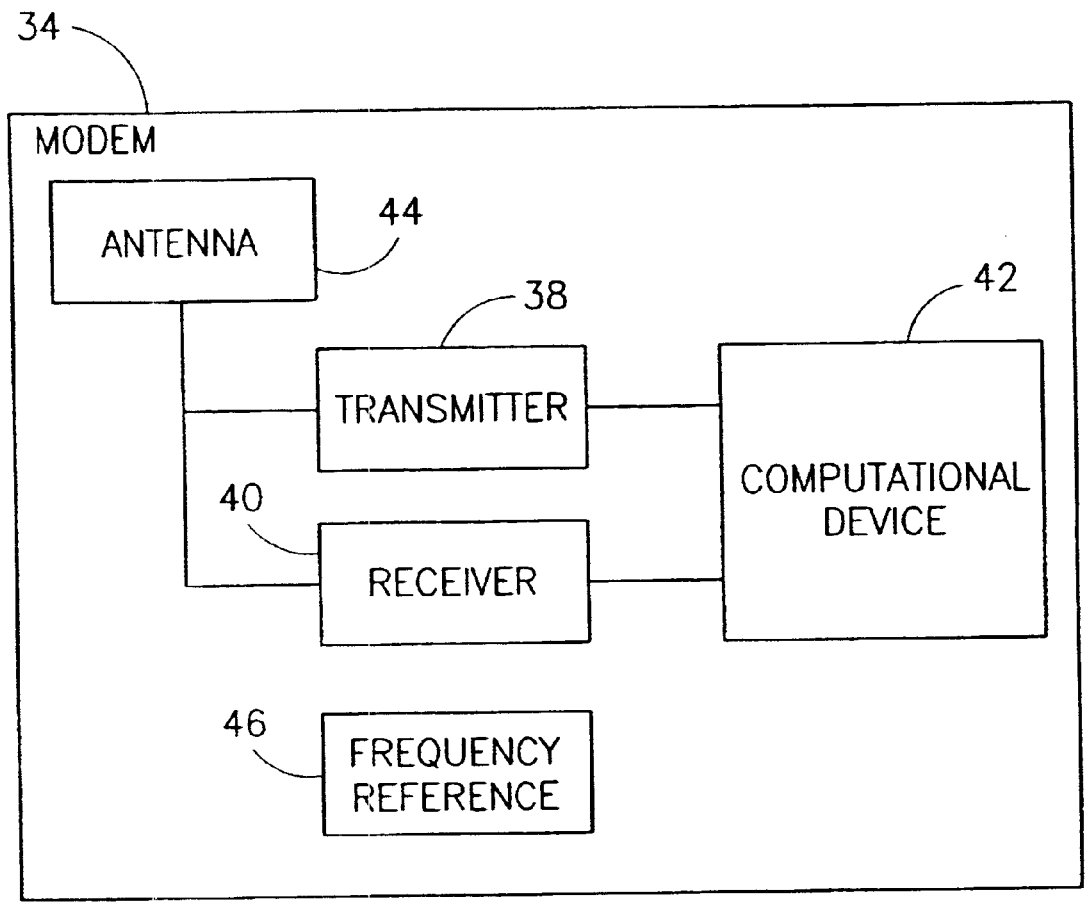
FIG. 3 is a schematic block diagram showing an exemplary remote asset transceiver according to a preferred embodiment of the present invention.
Figure 3:
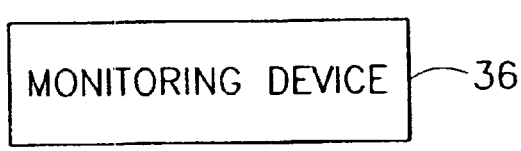

FIG. 3 is a schematic block diagram showing an exemplary ground remote asset transceiver according to a preferred embodiment of the present invention, implemented as part of the remote installation. As shown, a ground remote asset transceiver 32 features a RF modem 34, which could be a VHF modem for example. RF modem 34 is in communication with a monitoring device 36, preferably combined within the same housing as RF modem 34 to form a single unit. Monitoring device 36 monitors the function of at least one component of the remote installation (not shown). If a malfunction is detected, then monitoring device 36 sends a message to the central management station (not shown) through RF modem 34.

RF modem 34 could be implemented according to the modem disclosed in U.S. Pat. No. 5,666,648, for example, incorporated by reference as if fully set forth herein. In this implementation, RF modem 34 features a transceiver-satellite uplink transmitter 38, and a transceiver satellite downlink receiver 40, for sending and receiving signals, respectively. Transceiver-satellite downlink receiver 40 receives the signals and downconverts, demodulates and decodes these signals. The received signals from transceiver-satellite downlink receiver 40 are processed by a computational device 42, which could be any of the previously disclosed computational platforms, for example. Computational device 42 optionally decrypts the message, for example.

In addition, computational device 42 also prepares the signal for transmission by transceiver-satellite uplink transmitter 38, for example optionally by encrypting the message. Transceiver-satellite uplink transmitter 38 then encodes and modulates the message from computational device 42, and then upconverts the signal to the channel frequency for transmission. Transceiver-satellite uplink transmitter 38 is connected to an antenna 44 for transmitting the data. Antenna 44 could be a normal-mode helix antenna such as those employed with portable VHF transceivers. All of the steps of processing of the signal itself which are performed by transceiver-satellite uplink transmitter 38 and transceiver-satellite downlink receiver 40 are performed with reference to a frequency reference 46.

As another optional embodiment, the system and method of the present invention could be used for alarms against theft, for example. In this embodiment, the remote transceiver could be implemented with a GPS (global positioning system), such that the stolen equipment could be located and recovered if possible. Other optional embodiments include for medical emergencies, particularly in remote areas, and for other types of data transmissions which must occur extremely rapidly in "real time".

Figure 4:
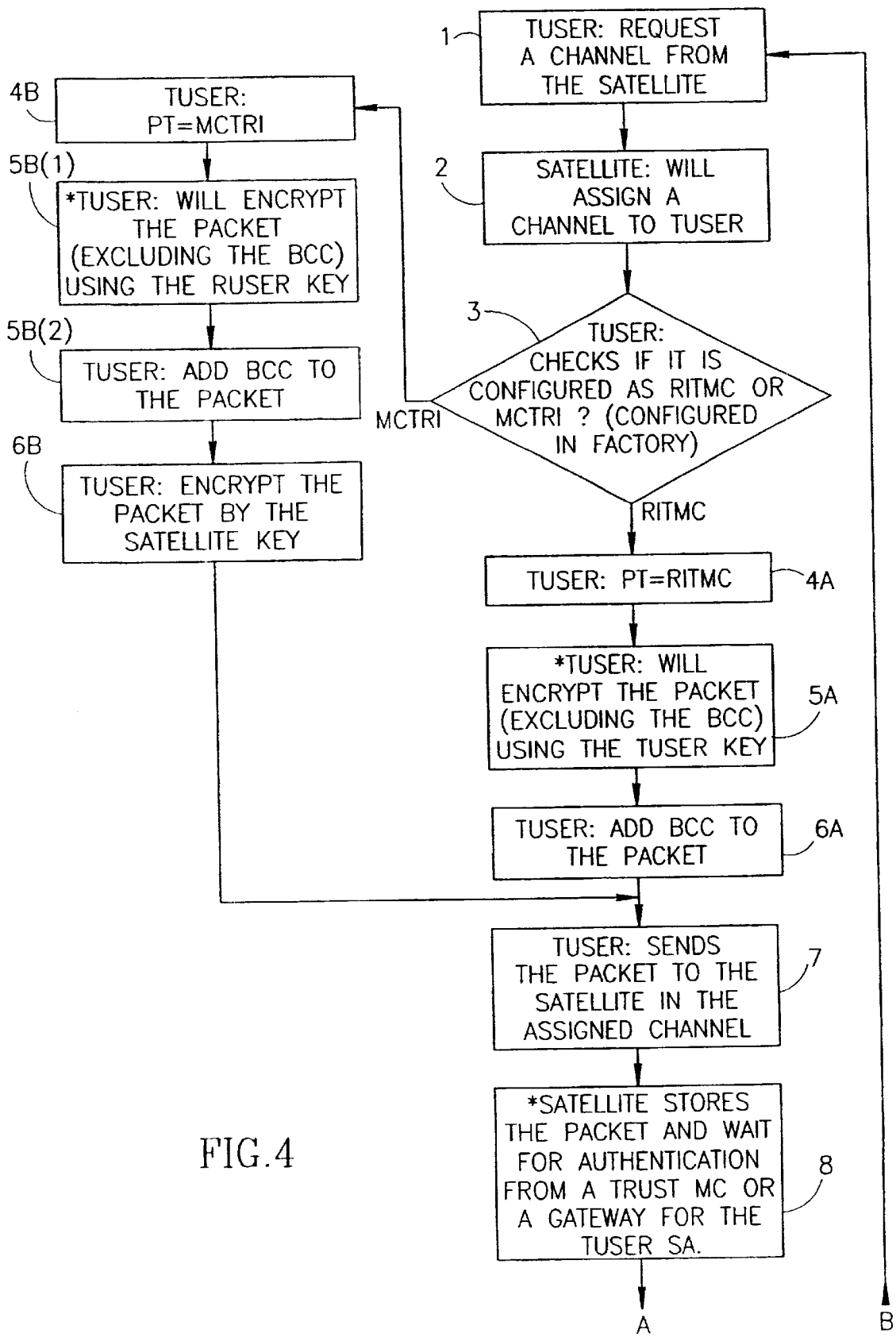
FIG. 4 is a flowchart of an exemplary method according to the present invention.
Figure 4A:
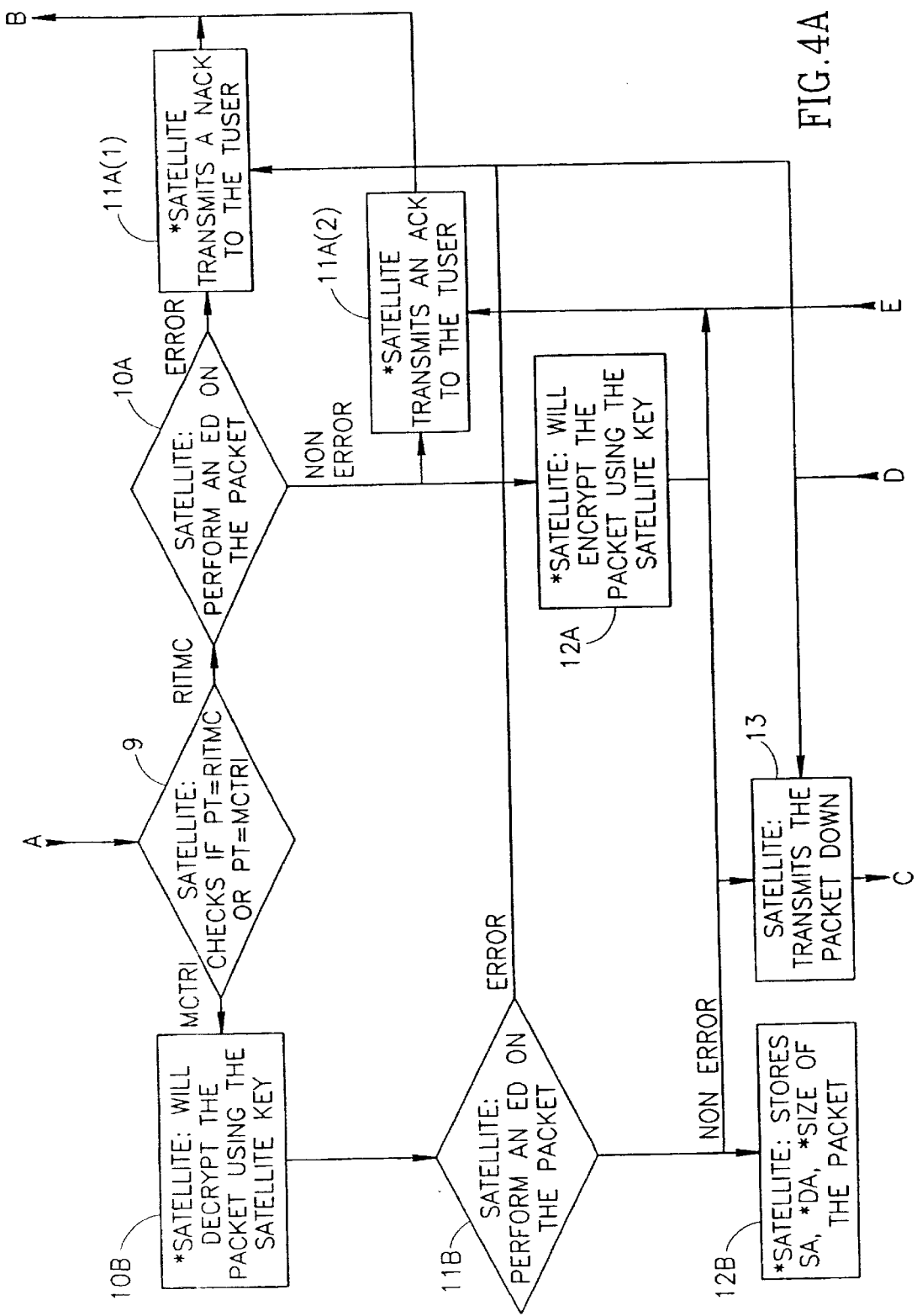
Figure 4B:
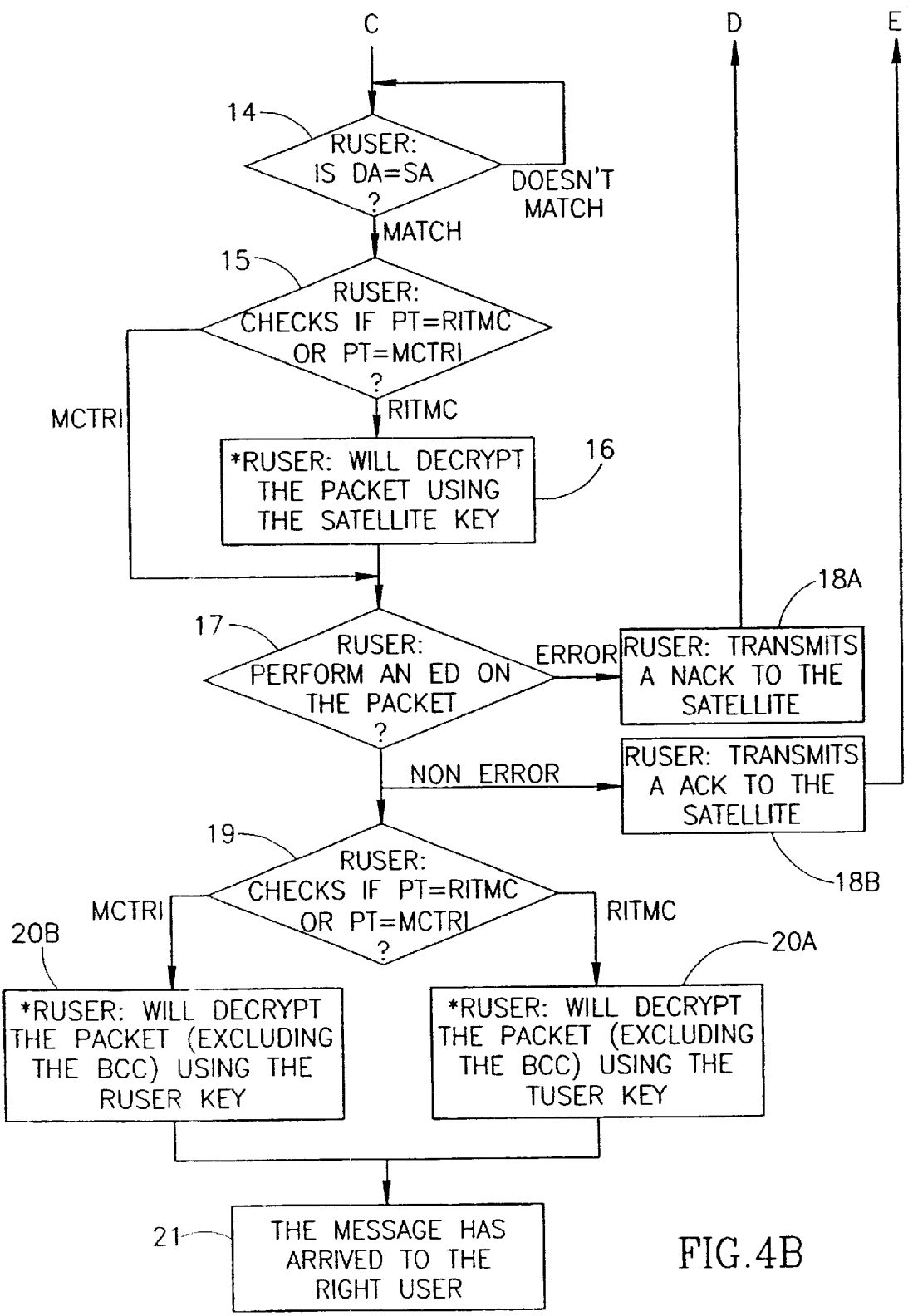

FIG. 4 is a flowchart of an exemplary, illustrative method according to the present invention. In step 1, the TUser (transmit user, or ground remote asset transceiver 24 of FIG. 2 for example) requests a channel from the satellite in order to be able to transmit at least one packet or other type of data unit, referred to herein as "packed" for the sake of clarity but without intending to be limiting in any way. The term "packet" generally refers to a unit of data of a predetermined structure for being transmitted over a network. The packet structure includes a header, the data to be transmitted, and optionally and preferably, a code for performing an error-chocking routine (definition from http://www.currents.net/resources/dictionary). The preferred packet structure features a header, which includes a destination address (DA) of the final recipient receiver (final recipient customer device 28 of FIG. 2 for example), a packet type (PT), a source address (SA) of the TUser, the message data itself and optionally and preferably, a block check character (BCC) for performing an error-checking routine, such as checksum.

In step 2, the satellite assigns a channel to TUser. In step 3, the TUser determines whether it is configured for transmitting RITMC (remote installation to management center) or MCTRI (management center to remote installation). The term RITMC is also assumed to encompass communication between two remote installations, termed "STS", such that those steps which are described for RITMC are also applicable for STS communication. Although these terms are described with regard to the preferred embodiment of the present invention as an alarm system for remote installations, it is understood that the exemplary method described herein could be used with any embodiment of the present invention.

Preferably, such a configuration as RITMC or MCTRI is determined for the TUser device at the time of manufacture. More preferably, RITMC is the default configuration. Depending upon the type of configuration, the flowchart now divides into two paths for the next steps describing the transmission of the message by TUser.

If the TUser is configured such that the packet type is RITMC, as shown in step 4a, then in step 5a, TUser encrypts the packet to be sent only with the TUser encryption key. This encryption key is preferably unique to TUser as a transmitting device. Also preferably, the block check character (BCC) and the packet type are not encrypted. More preferably, the destination address and the packet type (PT) are also not encrypted. In step 6a, TUser adds the BCC to the packet. In step 7, the TUser sends the packet to the satellite in the assigned channel.

Alternatively, if the TUser is configured such that the packet type is MCTRI as shown in step 4b, then in step 5b, TUser encrypts the packet. Again preferably, the block check character (BCC), the destination address and the packet type are not encrypted. However, for this configuration, the encryption process preferably occurs in two stages. In the first stage, denoted as step 5b(1), the packet is optionally and preferably encrypted with the RUser encryption key, which is preferably unique to a particular RUser (the final recipient receiver, see below for details). Next, in step 5b(2), the BCC is preferably added to the packet. In step 6b, TUser encrypts the packet with a satellite encryption key, which is preferably unique to the receiving satellite from which the channel was requested. Also preferably, the destination address and the packet type are not encrypted as noted previously. In step 7, the TUser sends the packet to the satellite in the assigned channel as for the previous configuration.

In step 8, the satellite receives the packet from the TUser and optionally and preferably stores the packet to wait for authentication from a Trust MC (trust management center). The Trust MC is preferably associated with a ground gateway station in communication with the TUser, such that the Trust MC is able to authenticate the identity of the transmitting device before the packet is sent from the satellite. This optional but preferred authentication process substantially prevents unauthorized users from gaining access to the satellite for transmitting messages.

In step 9, the satellite examines the packet type in the header of the packet to determine if the TUser is RITMC or MCTRI. Again, depending upon the type of TUser configuration, the method divides into two paths for the processing performed by the satellite.

If the TUser is configured as RITMC, then in step 10a, the satellite performs an error detection (ED) process on the packet. Such a process preferably includes the step of comparing the block check character to the checksum of the packet as it is received, in order to ensure that the packet is correctly and completely received. Alternatively, any other type of error correcting routine could be performed rather than comparing the checksum, such as the CRC. Next, in step 11a(1), if an error is detected, the satellite optionally and preferably sends a "no acknowledgment" (NACK) message to the sending TUser, to indicate that the message has not been correctly received by the satellite. The method then ends.

Alternatively, in step 11a(2), if no error is detected, the satellite optionally and preferably sends an "acknowledgment" (ACK) message to the sending TUser, to indicate that the message has been correctly received by the satellite. Next, in step 12a, the satellite optionally and preferably encrypts the packet with the satellite key, which as previously described is preferably unique to the satellite. In step 13, the satellite then transmits the packer down to the ground receiving device of RUser.

If the satellite determines that TUser has the alternative configuration as MCTRI, then in step 10b, the satellite optionally and preferably decrypts the packet by using the satellite encryption key, if such encryption was previously performed Next, in step 11b, the satellite performs an error detection process on the packet, substantially as previously described for the first configuration of TUser, optionally with NACK or ACK messages as appropriate.

Alternatively, in step 12b, if no error is detected, the satellite preferably stores the source address and destination address for the packet, and optionally the size of the packet, for later billing of the customer. Again, in step 13, the satellite then transmits the packet down to the final recipient receiver (RUser).

In step 14, the RUser first examines the packet header to determine if the destination address for the packet is identical to the source address for that particular RUser. If the addresses do not match, then preferably the packet is rejected.

In step 15, if the addresses are identical, then RUser determines whether the packet type is RITMC or MCTRI. If the packet type is RITMC, then in step 16, RUser optionally and preferably decrypts the packet with the satellite encryption key, if the packet was encrypted with this key as previously described. The method then proceeds to step 17. Alternatively, if the packet type is MCTRI, then the method proceeds directly to step 17, without performing step 16.

In step 17, RUser performs an error detection process on the packet preferably substantially as previously described for the first configuration of TUser.

Optionally and preferably, in step 18a, if the error detection process detects an error, then a NACK message is sent to the satellite, and preferably from the satellite to TUser, as previously described. Alternatively, in step 18b, if the error detection process does not detect an error, then an ACK message is sent to the satellite, and preferably from the satellite to TUser, as previously described.

In step 19, RUser then again determines whether the packet type is RITMC or MCTRI. If the packet type is RITMC, then in step 20a, RUser optionally and preferably decrypts the packet, exclusive of the BCC, and preferably exclusive of the destination address (DA) and packet type (PT), by using the TUser key. Alternatively, if the packet type is MCTRI, then in step 20b, RUser optionally and preferably decrypts the packet, exclusive of the BCC, again preferably exclusive of the destination address (DA) and packet type (PT), by using the RUser key. In step 21, if RUser is able to extract the data from the message portion of the packet, then (tie correct recipient has received the packet.

It will be appreciated that the above descriptions are intended only to serve as examples, and that many other embodiments are possible within the spirit and the scope of the present invention.

What is claimed is:

1. A method for transmitting a message in real time from a transmitter to a receiver through a single satellite, wherein the receiver is the final recipient of the message and wherein the receiver is one of a plurality of receivers, the method consisting essentially of:
   transmitting the message by the transmitter to the satellite, the message having a destination address;
   broadcasting the message by the satellite directly to the plurality of receivers without passing the message to a ground station, and wherein the message is broadcast by the satellite without regard to said destination address;
   examining the message by each of the plurality of receivers to determine if said destination address matches an address for each receiver; and
   if said destination address matches said address for the receiver, extracting the message by the receiver.

2. The method of claim 1, wherein said message is packaged in a packet by the transmitter before being transmitted.

3. The method of claim 2, wherein the transmitter encrypts said packet before transmitting said packet to the satellite, wherein extracting the message includes decrypting said packet by the receiver.

4. The method of claim 2, wherein extracting the message further includes performing an error detection process on said packet, such that if an error is detected, the receiver sends a NACK (no acknowledgement) message to the transmitter through the satellite, wherein said NACK message is broadcast by the satellite without regard to an address of the transmitter.

5. A method for transmitting a message in real time from a transmitter to a receiver through a single satellite, wherein the receiver is the final recipient of the message and wherein the receiver is one of a plurality of receivers, the method consisting essentially of:
   packaging the message in a packet by the transmitter;
   transmitting said packet by the transmitter to the satellite, said packet having a destination address and a source address, wherein said source address is an address of the transmitter and said destination address is an address of a correct receiver;
   extracting said source address by the satellite;
   authenticating said source address by a trust management center to the satellite, such that the transmitter is an authorized transmitter;
   if the transmitter is an authorized transmitter, broadcasting said packet by the satellite directly to the plurality of receivers without regard to said destination address;
   examining said packet by each of the plurality of receivers to determine if said destination address matches an address for each receiver; and
   if said destination address matches said address for the receiver, extracting the message from said packet by the receiver.

6. The method of claim 5, wherein the transmitter encrypts said packet before transmitting said packet to the satellite, wherein extracting the message includes decrypting said by the receiver.

7. The method of claim 6, wherein the message further includes performing an error detection process on said packet, such that if an error is detected, the receiver sends a NACK (no acknowledgement) message is broadcast by the satellite without regard to an address of the transmitter.

8. A new method for transmitting a message in real time from a transmitter to a receiver through a single satellite, wherein the receiver is the final recipient of the message and wherein the receiver is one of a plurality of receivers, the method consisting essentially of:
   packaging the message in a packet by the transmitter;
   encrypting said packet by the transmitter;
   transmitting said packets by the satellite to the satellite, said packet having a destination address;
   broadcasting said packet by the satellite without regard to said destination address;
   examining said packet by each of the plurality of receivers to determine if said destination address matches for each receiver;
   if said destination address matches said address for the receiver, decrypting said packet by the receiver; and
   extracting the message from said packet by the receiver.

* * * * *